United States Patent [19]

Bush

[11] Patent Number: 5,058,990
[45] Date of Patent: Oct. 22, 1991

[54] STEREOSCOPIC VIEWER AND VIEW PANELS THEREFOR

[76] Inventor: Timothy H. Bush, 29 Blodgett St., Clarendon Hills, Ill. 60514

[21] Appl. No.: 439,484

[22] Filed: Nov. 21, 1989

[51] Int. Cl.$^5$ .............................................. G02B 27/22
[52] U.S. Cl. ..................................... 359/474; 359/477
[58] Field of Search ................................. 350/132, 140

[56] References Cited

U.S. PATENT DOCUMENTS

| | | |
|---|---|---|
| 502,450 | 8/1893 | Wagner . |
| 1,097,601 | 5/1914 | Maerz . |
| 1,194,057 | 8/1916 | Murphy . |
| 1,197,679 | 9/1916 | Stern . |
| 1,204,613 | 4/1912 | Berger . |
| 1,257,327 | 2/1918 | Disney . |
| 1,392,327 | 10/1921 | Hattersley . |
| 2,018,739 | 8/1934 | Pauchek . |
| 2,131,444 | 1/1936 | Lateltin . |
| 2,187,765 | 7/1936 | Walter . |
| 2,621,562 | 8/1950 | Stone . |
| 2,757,573 | 8/1956 | Turner . |
| 2,821,884 | 2/1958 | Austin . |
| 2,984,153 | 5/1961 | Brennan . |
| 3,391,971 | 7/1968 | Kaufman . |
| 4,730,898 | 3/1988 | Curtin . |
| 4,789,220 | 12/1988 | Kinnard . |

*Primary Examiner*—Bruce Y. Arnold
*Assistant Examiner*—Rebecca D. Gass
*Attorney, Agent, or Firm*—Willian Brinks Olds Hofer Gilson & Lione

[57] ABSTRACT

A stereoscope includes a body having a base panel and a septum panel, wherein the front and rear edges of the base and septum panels each define at least one respective tab. A lens assembly having a lens panel that supports a pair of lenses defines multiple tab receiving slots, each positioned to receive a respective one of the tabs to support the septum panel in a pre-determined position with respect to the base panel and to hold the lens assembly on the body. A stereoscopic view panel has a pair of stereoscopic views fixedly positioned on the view panel. The view panel defines multiple tab receiving slots, each receiving a respective one of the tabs to secure the view panel to both the septum and base panels, with the septum panel precisely positioned between the stereoscopic views.

34 Claims, 4 Drawing Sheets

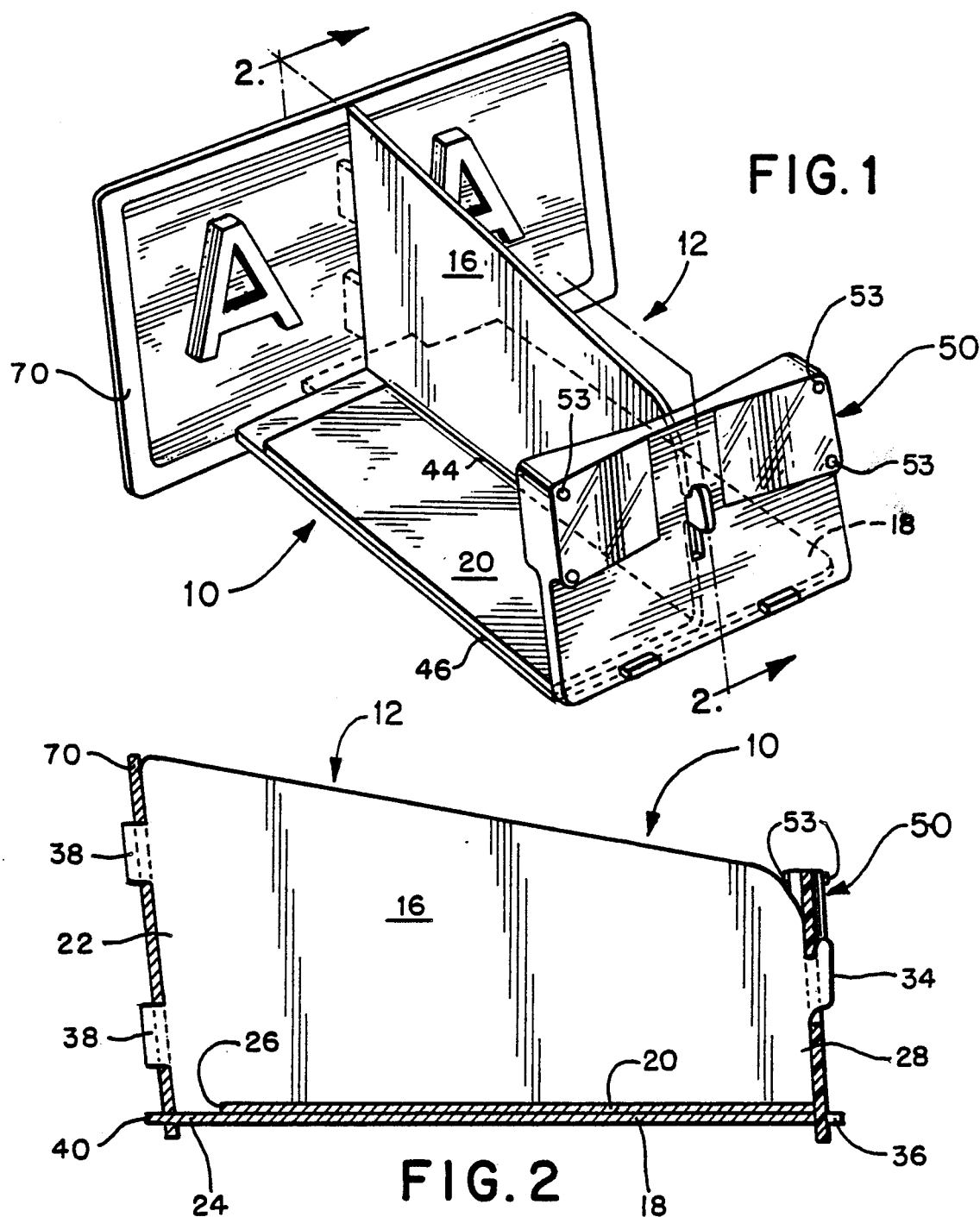

STEREOSCOPIC VIEWER AND VIEW PANELS THEREFOR

BACKGROUND OF THE INVENTION

This invention relates to a stereoscopic viewer of the type used to position a pair of stereoscopic views in proper alignment in front of a pair of viewing lenses.

Stereoscopic viewers or stereoscopes have been in use for some time, and have been patented since at least as as the 1890's. The following patents all disclose specific stereoscope structures.

| U.S. Pat. No. | Inventor |
| --- | --- |
| 502,450 | Wagner |
| 1,024,613 | Berger |
| 1,097,601 | Maerz |
| 2,018,739 | Pauchek |
| 2,131,444 | Lateltin |
| 2,187,765 | Walter |
| 2,757,573 | Turner |
| 2,821,884 | Austin |
| 2,984,153 | Brennan |
| 3,391,971 | Kaufman |
| 4,730,898 | Curtin |
| 4,789,220 | Kinnard |

In each case the viewer includes an arrangement for supporting a view card bearing a pair of stereoscopic views in a spaced relationship to a pair of lenses. The user looks through the lenses at the stereoscopic views to create the illusion of a three dimensional view.

The structure of the stereoscopic viewer can have an important effect on how easily the viewer can create the three dimensional illusion. For example, if the viewer does not hold the views in the optimal position with respect to the lenses, it may be more difficult for the viewer to obtain the three dimensional illusion. For this reason, it is important that the viewer be relatively rigid and that it support the views in the proper position with respect to the lenses.

Furthermore, for at least some users it is easier to create the stereoscopic illusion if the viewer presents an uncluttered field of view, thereby allowing the user to concentrate on the view itself, rather than extraneous features of the viewer.

Thirdly, I have noticed that a septum panel extending between the views from the lenses to the views can help to isolate one view from the other and make the viewer itself easier to use.

None of the prior art stereoscopic viewers disclosed in the patents identified above is optimized to provide the three functions described above. For example, Brennan U.S. Pat. No. 2,984,153 does not provide any type of septum panel extending between the views. Furthermore, the view panel simply hangs from a rod but is not braced against movement out of the desired plane. Walter U.S. Pat. No. 2,187,765 does provide a septum panel between the lenses and the views, but the field of view of the user is relatively cluttered by extraneous edges and surfaces of the viewer itself. Maerz U.S. Pat. No. 1,097,601 and Berger U.S. Pat. No. 1,024,613 both disclose folding stereoscopes. The Berger device includes a pair of upstanding panels that support the viewer panel and act as partitions between the pictures. However, with this arrangement the view panel containing the stereoscopic pictures is supported against twisting only at its central portion where it passes through the partitions. The same can be said of the stereoscope disclosed in Maerz. which additionally does not have a panel extending from the lenses to the View panel between the pictures.

Kaufman U.S. Pat. No. 3,391,971 discloses a foldable cardboard stereoscopic viewer which uses a relatively complex arrangement including bands to hold the view panel in place in the viewer.

SUMMARY OF THE INVENTION

This invention is directed to an improved stereoscopic viewer that utilizes the view panel as a structural component of the viewer such that the view panel makes the viewer more rigid, and vice versa.

According to this invention, a stereoscope is provided comprising a body having a septum panel connected to a base panel, both panels having respective front and rear edge portions. The stereoscope includes a lens assembly having a lens panel and a pair of lenses fixedly positioned on the lens panel, and a view panel having a pair of stereoscopic views fixedly positioned on the view panel. Means are provided for securing the lens panel to the front edge portions of the septum and base panels to secure the septum panel in a predetermined position with respect to the base panel and form a substantially rigid assembly therewith. Additionally, first means releasably mechanically interlock the view panel with the rear edge portion of the septum panel to positively position the septum panel in a predetermined location between the views. Second means releasably mechanically interlock the view panel with the rear edge portion of the base panel. The first and second means cooperate to form a substantially rigid assembly of the septum panel, the base panel and the view panel.

Typically, the view panel is made of cardboard or the like and has much greater rigidity in the plane of the view panel than transverse to the view panel. In the embodiment described below the septum and base panels are positioned at right angles to the view panel, and each of the septum and base panels is much more rigid in its own plane than it is transversely to that plane. The first and second means releasably mechanically interlock the three panels to create a three dimensional assembly in which the view panel braces the septum and base panels and vice versa.

The first and second means for releasably mechanically interlocking the view panel with the septum and base panels can comprise tabs in the base and septum panels and tab receiving slots or notches in the view panel itself. Such slots or notches can be made without substantially increasing the cost of the view panel, and they provide a particularly cost effective way of implementing this invention.

This invention is also directed to a stereoscopic view set for a stereoscope, which can be of the type described above. The stereoscopic view set of this invention includes a view panel which supports a pair of stereoscopic views in side by side arrangement, fixedly positioned on one surface of the view panel. The panel defines a lower edge and a central portion, and the views are positioned on respective sides of the central portion. The panel of this invention defines at least one tab receiving slot or notch positioned in the central portion between the views, and at least one view panel locating feature positioned adjacent the lower edge beneath the views.

The tab receiving slot or notch is intended to engage the septum of a viewer, and can be positioned either centrally or along the upper edge of the view panel. The view panel locating feature can comprise one or more slots, tabs, or edge portions positioned adjacent the lower edge portion beneath the views.

The invention itself, together with further objects and attendant advantages, will best be understood by reference to the following detailed description, taken in conjunction with the accompanying drawings.

BRIEF DESCRIPTION OF THE DRAWINGS

FIG. 1 is a perspective view of a stereoscopic viewer which incorporates a presently preferred embodiment of this invention.

FIG. 2 is a cross-sectional view taken along line 2—2 of FIG. 1.

DETAILED DESCRIPTION OF THE PRESENTLY PREFERRED EMBODIMENTS

Figure 3:
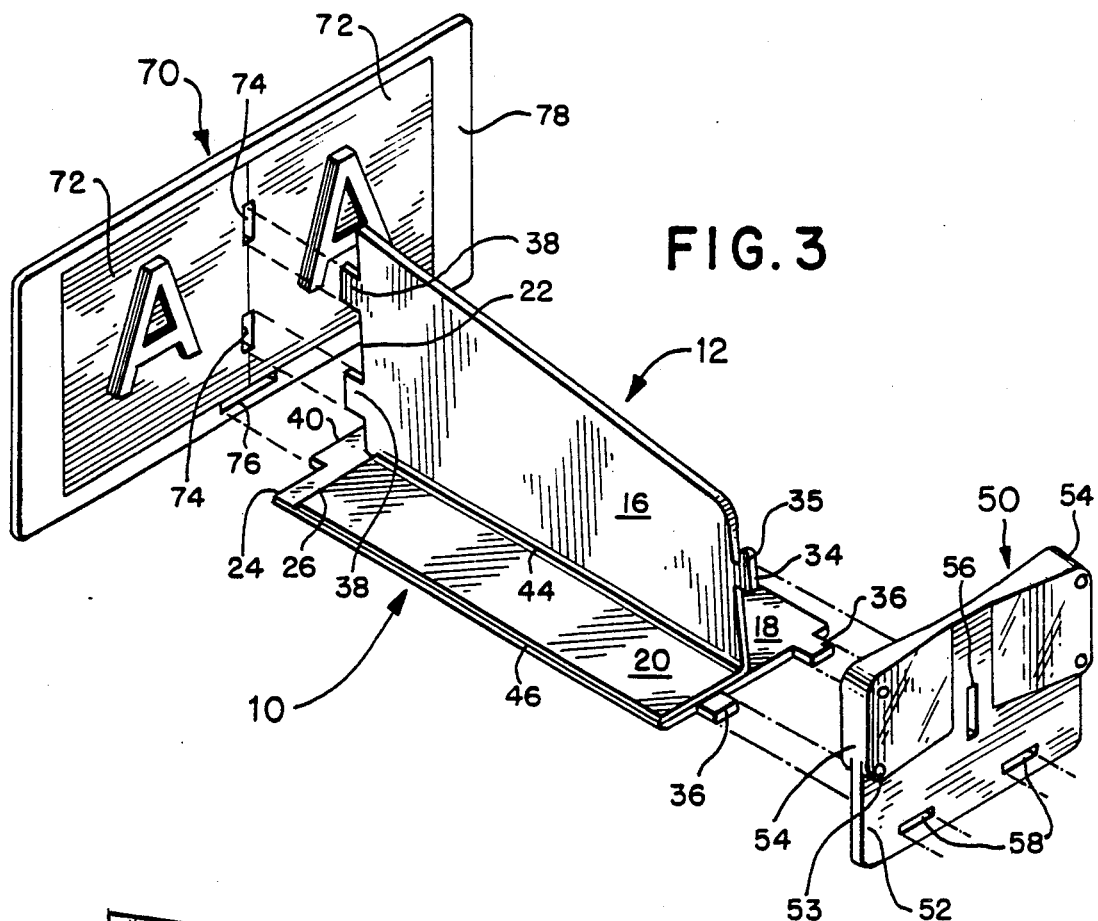
FIG. 3 is an exploded perspective view of the viewer of FIG. 1.
Figure 4:
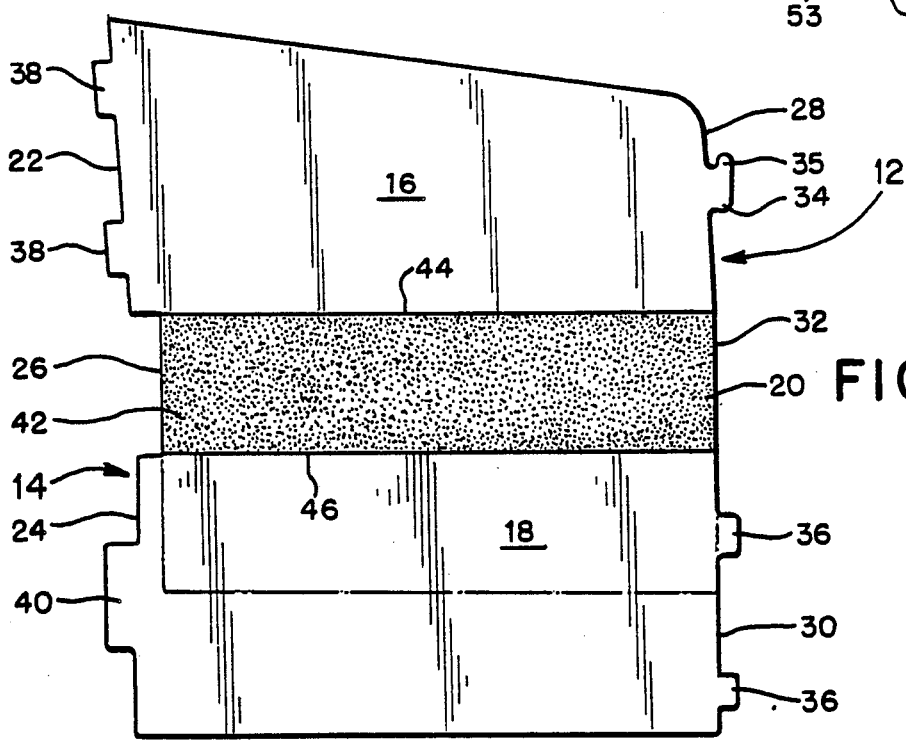
FIG. 4 is a plan view of the body of the viewer of FIG. 1 before it is folded into its final configuration.

FIGS. 1-4 show various views of a preferred embodiment 10 of the stereoscope of this invention. This stereoscope 10 includes a body 12 that is formed as a composite panel 14 (FIG. 4). The composite panel 14 includes three component panels: a septum panel 16, a base panel 18, and a third panel 20 interposed between the septum and base panels 16, 18. In FIG. 4 reference numerals 22, 24, 26 are used to designate the rear edge portions of the septum, base and third panels 16, 18, 20, respectively, and the reference numerals 28, 30 and 32 are used to designate the front edge portions of the septum, base and third panels 16, 18, 20, respectively.

In this embodiment the composite panel 14 is formed of a light weight material such as cardboard, and the septum, third and base panels 16, 20, 18 are separated by respective fold lines 44, 46. FIG. 4 shows a plan view of the composite panel 14 as initially formed, before it is folded to the configuration shown in FIG. 1. A suitable adhesive 42 can be used between the overlapping portions of the base panel 18 and the third panel 20 to secure them together. The fold line 44 defines a hinge axis for the septum panel 16. As best shown in FIG. 3, the rear edge portion 26 of the third panel 20 is recessed with respect to the rear edge portions 22, 24 of the septum and base panels 16, 18.

As best shown in FIGS. 2 and 3, the front edge portion 28 of the septum panel 16 defines an upper lens tab 34 which forms an upstanding ear 35. Similarly, the front edge portion 30 of the base panel 18 defines a pair of lower lens tabs 36.

As best shown in FIGS. 2-4, the rear edge portions 22, 24 of the septum and base panels 16, 18 define upper and lower view tabs 38, 40, respectively. The tabs 34, 36, 38, 40 can be die cut as the composite panel 14 is formed.

As best shown in FIG. 3, the stereoscope 10 also includes a lens assembly 50 which in this embodiment is a molded plastic assembly that includes a lens panel 52 and a pair of prismatic lenses 54 integrally formed with the lens panel 52. Upper and lower slots 56, 58 are formed in the lens panel 52, and these slots 56, 58 are positioned to engage the upper and lower lens tabs 34, 36, respectively. Preferably, the lens panel 52 around the lenses 54 is provided with a frosted or pebbled finish to prevent a user from attempting to look through the lens panel 52. When the lens assembly 50 is mounted to the body 12 by the tabs 34, 36, the lens assembly 50 is releasably mechanically interlocked both with the septum panel 16 and the base panel 18 (FIG. 2). The septum and base panels 16, 18 are arranged in mutually perpendicular planes, and the lens panel 52 is perpendicular to the plane of the septum panel 16 and substantially (though by design not exactly) perpendicular to the plane of the base panel 18. By releasably mechanically interlocking the three panels 16, 18, 52, a substantially rigid structure results, in which the septum panel 16 is positively located in a predetermined position between the two lenses 54. Preferably scratch protection nubs 53 are molded in the lenses 54. Of course the nubs 53 may be replaced with ridges (not shown) extending between the lens faces or parallel to an edge of the lens 54.

The stereoscope 10 is intended for use with replaceable view panels 70. As best shown in FIG. 3, each view panel includes two stereoscopic views 72 which are fixed in place on the panel 70. In many cases, the views 72 will actually be printed directly on the view panel 70, which for example can be formed of paper or cardboard. Upper and lower slots 74, 76 are formed in the view panel 70, as for example by die cutting. The upper slots 74 are positioned to engage the upper view tabs 38, and are positioned in a central portion of the view panel 70 between the views 72. Preferably, the views 72 extend around the upper slots 74 such that the views 72 disappear behind the septum panel 16 when the stereoscope 10 is fully assembled (FIG. 1). The view panel 70 defines a border 78 around the views 72.

The upper and lower slots 74, 76 in the view panel 70 releasably mechanically interlock the view panel 70 with the upper and lower view tabs 38, 40 of the body 12. This arrangement provides a number of important advantages First, the view panel 70 is precisely positioned in a predetermined position with respect to the body 12 and the lens assembly 50. Second, the view panel 70 is supported in two perpendicular planes, and thus proper orientation of the view panel 70 is less dependent upon the rigidity of the view panel 70 outside the plane of the view panel 70. Third, the view panel 70 becomes a structural part of the stereoscope 10, and the view panel 70 positively positions the septum panel 16 in the optimal position, centered between the views 72. Fourth, because the view panel 70 is perpendicular to the septum panel 16 and substantially perpendicular to the base panel 18, the three panels 70, 16, 18 mutually reinforce one another to provide a substantially rigid structure. In particular, the view panel 70 braces the septum panel 16 from hinging about the fold line 44 away from its desired position.

In addition to providing a rigid structure, the stereoscope 10 provides a number of other important advantages. Because the view panel 70 and the lens panel 52 are parallel but slightly tilted with respect to the base panel 18 (FIG. 2), objectionable reflections off of the base and third panels 18, 20 are reduced. The recessed rear edge portion 26 of the third panel 20 ensures that the intersection between the body 12 and the view panel 70 is colinear along the bottom of the views 72, thereby eliminating one potential distraction to the viewer. Preferably, the border 78 and the visible portions of the septum, base and third panels 16, 18, 20 are the same neutral color, again to reduce potential distractions to the user. The body can be folded flat with the septum panel 16 parallel to the base panel 18 once the view panel 70 and lens assembly 50 are removed.

Of course, the number and position of the tabs 34, 36, 38, 40 can be varied as desired for the particular application. For example, if desired the slots 74, 76 in the view panel 70 can be selected to divide the view panels 70 into sets, each set working only with one particular type of body 12.

Figure 5:
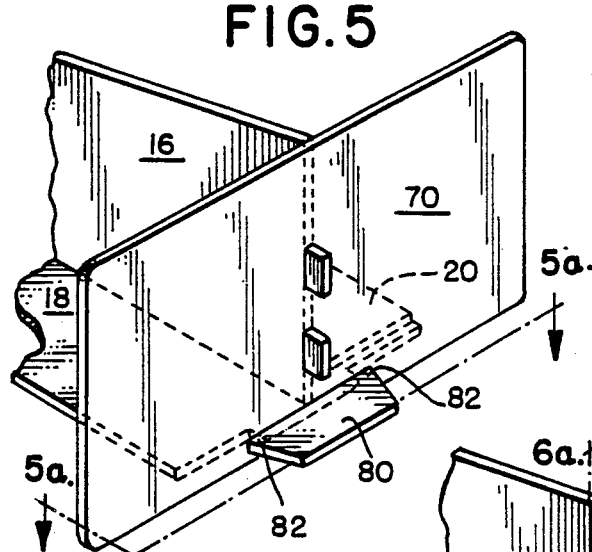
FIG. 5 is a fragmentary perspective view of a first alternative tab suitable for use in the viewer of ,/ FIG. 1.
Figure 5A:
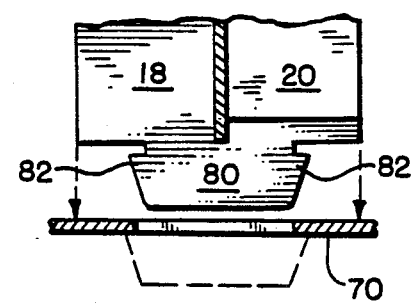
FIG. 5a is a cross-sectional view taken along line 5a—5a of FIG. 5.
Figure 6:
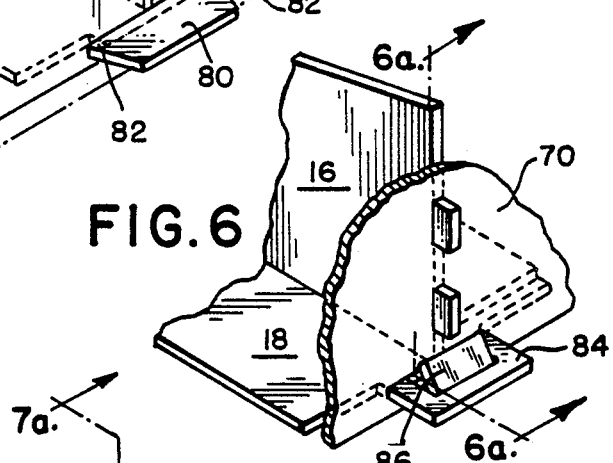
FIG. 6 is a fragmentary perspective view of a second alternative tab suitable for use in the viewer of FIG. 1.
Figure 6A:
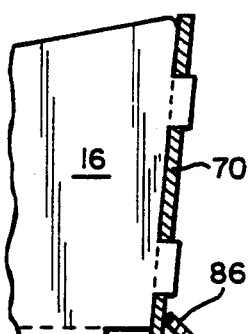
FIG. 6a is a cross-sectional view taken along line 6a—6a of FIG. 6.

It will be recognized that a number of changes and modifications can be made to the stereoscope 10. For example, as shown in FIGS. 5 and 5a, any of the tabs 34, 36, 38, 40 can be formed in an alternate configuration as shown at reference numeral 80. This alternate configuration includes locking wedges 82 along the sides of the tab 80 to positively retain either the lens assembly or the view panel 70 in place. As shown in FIGS. 6 and 6a, another variation for the tabs 34, 36, 38, 40 utilizes a second alternative tab 84 having a locking plate 86 which extends up, out of the plane of the tab 81 to positively lock either the view panel 70 or the lens assembly in place after it is fully seated on the tab 84.

It will be recognized that the the upper and lower slots 74, 76 and the upper and lower view tabs 38, 40 form means for releasably mechanically interlocking the view panel 70 with the septum panel 16 and the base panel 18. Of course, other mechanical interlocking methods can be used, as suggested in the following alternative preferred embodiments.

Figure 7:
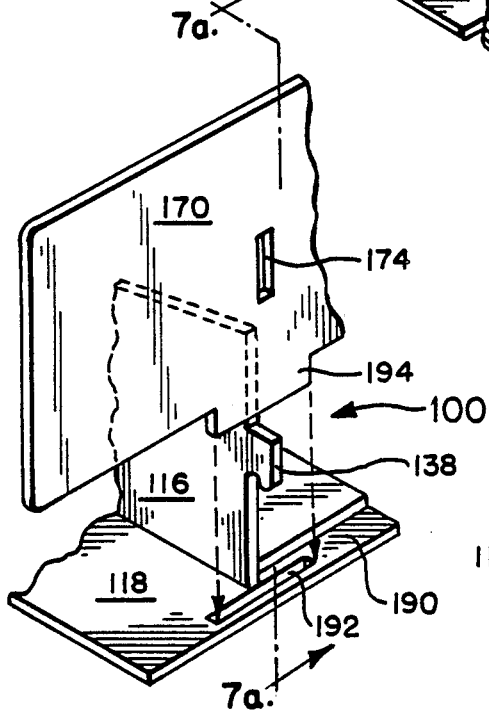
FIG. 7 is a fragmentary exploded perspective view of a viewer which incorporates a first alternative embodiment of the present invention.
Figure 7A:
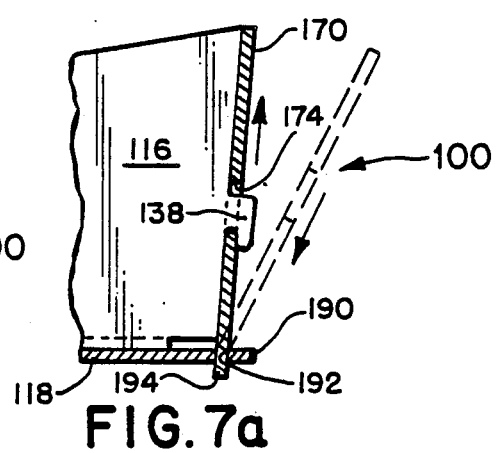
FIG. 7a is a cross-sectional view taken along line 7a—7a of FIG. 7.

FIGS. 7 and 7a show portions of a first alternative viewer 100, including a septum panel 116 and a base panel 118. The septum panel 116 defines an upper view tab 138 and the base panel 118 defines a base extension 190 which defines a base slot 192. The view panel 170 defines an upper slot 174 sized and positioned to receive the upper view tab 138. Additionally, the view panel 170 defines a view panel tab 194 positioned and sized to fit into the base slot 192.

As shown in FIG. 7a, the first alternative stereoscopic viewer 100 is assembled with the view panel 170 by first placing the view panel tab 194 in the base slot 192 and then flexing either the view panel 170 or the base extension 190 and pivoting the view panel 170 against the septum 116, so that the upper view tab 138 is received in the upper slot 174.

Figure 8:
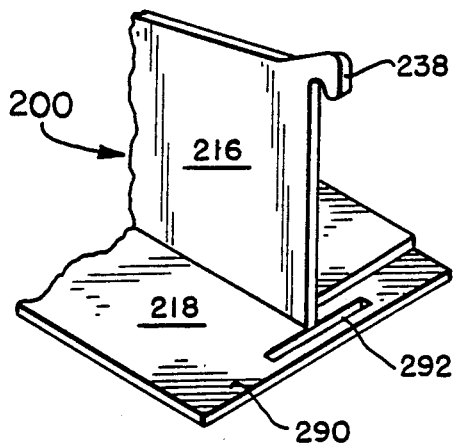
FIG. 8 is a fragmentary perspective view of a viewer which incorporates a second alternative preferred embodiment of this invention.
Figure 9:
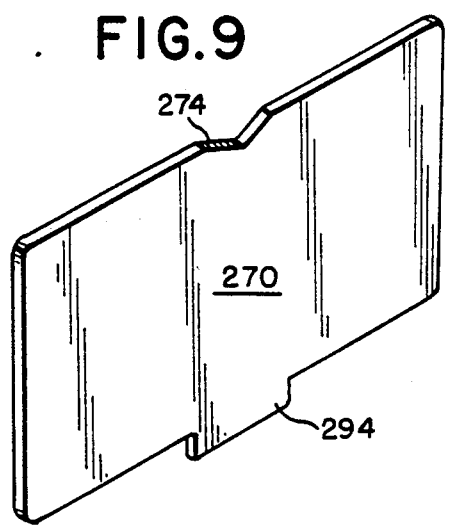
FIG. 9 is a perspective view of a view card suitable for use with the viewer of FIG. 8.

FIG. 8 shows a second alternative preferred embodiment of a stereoscopic viewer 200 which utilizes a septum 216, base panel 218, base extension 290 and base slot 292 similar to those described above in conjunction with FIGS. 7 and 7a. This viewer 200 is designed to be used with a view panel 270 (FIG. 9) which includes a view panel tab 294 similar to that described above. In the viewer 200 the upper portion of the septum panel 216 defines an upper view tab 238 designed to extend partly above the view panel 270. The view panel 270 defines a view panel slot 274 at its upper marginal edge that is shaped to receive the upper view tab 238. The view panel 270 is installed on the viewer 200 by placing the tab 294 in the base slot 292 and then slightly flexing the view panel 270 so as to engage the view panel slot 274 with the upper view tab 238.

Figure 10:
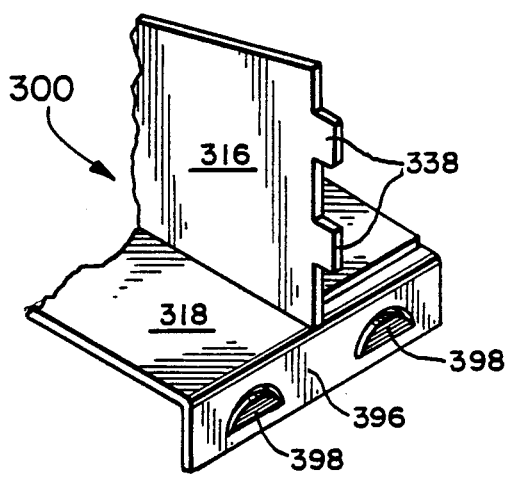
FIG. 10 is a fragmentary perspective view of a viewer which incorporates a third alternative preferred embodiment of this invention.
Figure 11:
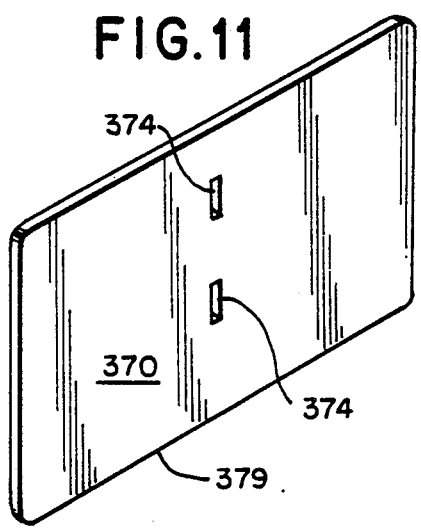
FIG. 11 is a perspective view of a view card suitable for use with the viewer of FIG. 10.

FIG. 10 shows a third alternative preferred embodiment of a viewer 300 which includes a septum 316, a base plate 318, and upper tabs 338 identical to those described above in connection with FIGS. 1-4. In the viewer 300 the base plate 318 defines a base plate extension 396 that is bent downwardly, at right angles to the base plate 318. This base plate extension 396 defines a pair of tabs 398 that protrude from the base plate extension 396. The view panel 370 defines upper slots 374 positioned to engage the upper tabs 338 and a lower edge 379 (FIG. 11). To use the viewer 300, the lower edge 379 of the view panel 370 is mounted in the space between the tabs 398 and the base plate extension 396, and then the view panel 370 is pivoted to move it against the septum panel 316, with the upper tabs 338 received in the upper slots 374.

Figure 12:
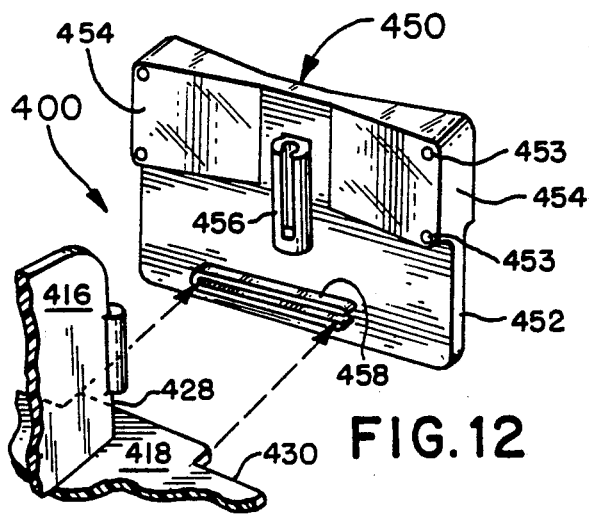
FIG. 12 is a fragmentary exploded perspective view of a viewer which incorporates a fourth alternative preferred embodiment of this invention.
Figure 13:
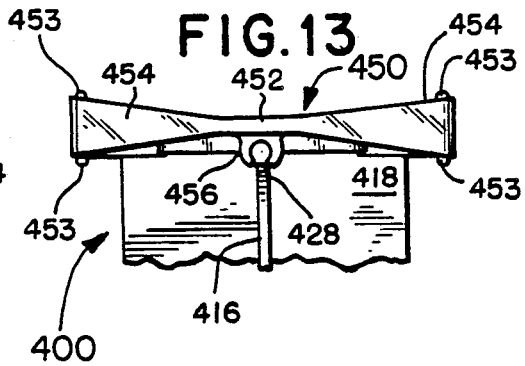
FIG. 13 is a top view of portions of the viewer of FIG. 12 in assembled relationship.

FIGS. 12-13 show a fourth alternative viewer 400 which includes a lens assembly 450 having a lens panel 452 and fixedly mounted lenses 454 and nubs 453 as described above. In this case the lens panel 452 defines upper and lower grippers 456, 458, which can be raised ridges molded into the lens panel 452 and are shaped to grip the front edge portions 428, 430 of the septum and base panels 416, 418. If desired, the front edge portions 428, 430 of the septum and base panels 416, 418 can be provided with enlargements designed to snap into the grippers 456, 458.

Simply to define the presently preferred embodiments in greater detail, and without intending in any way to limit the scope of this invention, the following details are provided. In this embodiment the view panel 70 can be formed of a material such as 9 to 12 point lithographic paper. The body 12 can be formed of cardboard such as 35 point SBS stock. The lens assembly 50 can be molded from a plastic such as acrylic, and the lenses can be prismatic lenses having 9 prism diopters (base out), 200 mm focal distance and 5 focal diopters.

The mechanical interlocking systems for the view panels shown in FIGS. 5-11 can be adapted to hold the lens assembly in place on the viewer. Round lenses and other materials may be substituted in alternate embodiments. The views may be printed on the view panels, and may represent photographs or cartoons. Alternately, the views may include photographs bonded in place on the view panel. The septum panel may be separately formed and then secured to the base panel in a gluing or sonic welding operation. Alternately the septum and base panels may be molded in one piece.

From the foregoing, it should be apparent that an improved stereoscopic viewer has been described which utilizes the view panel and the lens panel as structural elements of the viewer to hold the septum panel in position. The viewer can be manufactured inexpensively, and can readily be folded flat once the lens and view panels have been removed for shipment and storage. Distractions to the user are substantially eliminated by the design of the septum and base panels. Except for the lens assembly, the entire viewer can be made of low cost paper or cardboard. Alternatively, the body can be formed of sheet or molded plastic if desired. The lens assembly is relatively easy to fabricate, and even a child can easily assemble it with the body of the viewer. The lens assembly is designed without sharp edges or small pieces, and is large enough to prevent swallowing by a child.

It is intended that the foregoing detailed description be regarded as illustrative rather than limiting, and that it be understood that it is the following claims, including all equivalents, which are intended to define the scope of this invention.

I claim:

1. A stereoscope comprising:
   a body comprising a septum panel connected to a base panel, both panels having respective front and rear edge portions;
   a lens assembly comprising a lens panel and a pair of lenses fixedly positioned on the lens panel;
   a view panel comprising a pair of stereoscopic views fixedly positioned on the view panel in a predetermined position;
   means for securing the lens panel to the front edge portions of both the septum panel and the base panel to secure the septum panel in a predetermined position with respect to the base panel and form a substantially rigid assembly therewith;
   first means for releasably mechanically interlocking the view panel with the rear edge portion of the septum panel to positively position the septum panel in a predetermined location between the views;
   second means for releasably mechanically interlocking the view panel with the rear edge portion of the base panel, said second means cooperating with the first means to form a substantially rigid assembly of the septum panel, the base panel, and the view panel.

2. The invention of claim 1 wherein the first means comprises:
   a septum tab formed on the rear edge portion of the septum panel; and
   means, positioned between the views, for receiving the septum tab in the view panel.

3. The invention of claim 2 wherein the receiving means comprises a central portion of the view panel that defines a septum slot sized to receive the septum tab.

4. The invention of claim 2 wherein the receiving means comprises an edge portion of the view panel that defines a septum notch sized to receive the septum tab.

5. The invention of claim 1 wherein the second means comprises a base tab formed on the rear edge portion of the base panel and means for receiving the base tab in the view panel.

6. The invention of claim 5 wherein the receiving means comprises an edge portion of the view panel that defines a base slot sized to receive the base tab.

7. The invention of claim 1 wherein the second means comprises means, positioned in the rear edge portion of the base panel, for receiving an edge portion of the view panel.

8. The invention of claim 7 wherein the edge portion receiving means comprises a slot defined by the rear edge portion of the base panel.

9. The invention of claim 7 wherein the edge portion receiving means comprises at least one tab on the rear edge portion of the base panel positioned to receive the edge portion of the view panel between the tab and an adjacent portion of the rear edge portion of the base panel.

10. A stereoscope comprising:
    a body comprising a base panel and a septum panel, each having respective front and rear edges, said front edges of said base and septum panels each defining at least one front tab, said rear edges of said base and septum panels each defining at least one rear tab, said septum panel mounted to hinge with respect to the base panel along a hinge axis extending between the front and rear edges of the base panel;
    a lens assembly having a lens panel that supports a pair of lenses and defines a plurality of front tab receiving slots, each receiving a respective one of the front tabs to support the lens panel in a predetermined portion with respect to the base panel and to hold the lens assembly on the body, with each lens on a respective side of the septum panel, and
    a stereoscopic view panel having a pair of stereoscopic views fixedly positioned on the view panel in a predetermined position, said view panel defining a plurality of rear tab receiving slots, each receiving a respective one the rear tabs to releasably secure the view panel to the body and to the septum panel with the septum panel positioned between the stereoscopic views by the respective rear tab and rear tab receiving slots.

11. The invention of claim 10 wherein the lens assembly and the view panel hold the septum panel perpendicular to the base panel.

12. The invention of claim 10 wherein the lens assembly and the view panel are parallel and positioned perpendicular to the septum panel and at a large acute angle with respect to the base panel.

13. The invention of claim 10 wherein the septum and base panels are integral parts of a composite panel which additionally comprises an integral third panel interposed between the septum and base panels, and wherein each adjacent pair of the septum, third and base panels is separated by a respective fold line.

14. The invention of claim 13 wherein the composite panel is formed of a paper stock.

15. The invention of claim 13 wherein the base and third panels are positioned in overlapping relationship.

16. The invention of claim 15 wherein the base and third panels are adhesively secured together.

17. The invention of claim 13 wherein the third panel defines rear edge which is recessed with respect to the rear edges of the septum and base panels.

18. The invention of claim 13 wherein the composite panel is formed of cardboard.

19. The invention of claim 10 wherein the front tab of the septum panel defines an upstanding projection shaped to capture the lens assembly on the septum panel.

20. The invention of claim 10 wherein at least one of the rear tab receiving slots is interposed between the views, and at least one other one of the rear tab receiving slots is positioned beneath the views.

21. The invention of claim 20 wherein the at least one of the rear tab receiving slots is a four sided slot.

22. The invention of claim 20 wherein the views are separated by a distance no greater than the width of the at least one of the slots.

23. The invention of claim 22 wherein the at least one other one of the slots is positioned immediately adjacent to a lower edge of the views.

24. The invention of claim 10 wherein the lens panel and the lenses are integrally formed in one molded piece.

25. The invention of claim 24 wherein each of the lenses defines at least one raised lens protecting member positioned to extend outwardly from the respective lens.

26. The invention of claim 24 wherein the lenses are prismatic lenses.

27. A stereoscope comprising:
a body comprising a base panel and a septum panel, each having respective front and rear edges, said front edges of said panels each defining at least one front tab, said rear edges of said panels each defining at lest one rear tab, said septum panel mounted to hinge with respect to the base panel along a hinge axis extending between the front and rear edges of the base panel;
a stereoscopic view panel, having a pair of stereoscopic views fixedly positioned on the view panel, said view panel defining a plurality of rear tab receiving slots, each receiving a respective on the rear tabs to secure the view panel to the body with the septum panel positioned between the stereoscopic views;
a lens assembly comprising a lens panel and a pair of lenses positioned on the lens panel; and
means for releasably securing the lens panel to the septum panel with one of the lenses on each side of the septum panel.

28. A stereoscopic view set for a stereoscope, said view set comprising:
a view panel which supports a pair of stereoscopic views in side by side arrangement fixedly positioned in a predetermined position on one surface thereof, said panel defining a lower edge and a central portion, said views positioned on respective sides of the central portion;
said panel defining at least one tab receiving slot positioned in the central portion interposed directly between the views;
said panel defining at lest one view panel locating feature positioned adjacent the lower edge beneath the views.

29. The invention of claim 28 wherein the view panel locating feature comprises an additional tab receiving slot.

30. A stereoscopic view set for a stereoscope, said view set comprising:
a view panel which supports a pair of stereoscopic views in side by side arrangement fixedly positioned on one surface thereof, said panel defining a lower edge and a central portion, said views positioned on respective sides of the central portion;
said panel defining at least one tab receiving slot positioned in the central portion between the views;
said panel defining at least one view panel locating feature positioned adjacent the lower edge beneath the views;
wherein the view panel locating feature comprises an additional tab receiving slot; and
wherein the slots are each four sided slots.

31. The invention of claim 30 wherein the views are separated by a distance less than the width of the first tab receiving slot.

32. The invention of claim 31 wherein the additional tab receiving slot is positioned immediately adjacent the views.

33. A stereoscopic view set for a stereoscope, said view set comprising:
a view panel which supports a pair of stereoscopic views in side by side arrangement fixedly positioned on one surface thereof, said panel defining a lower edge and a central portion, said views positioned on respective sides of the central portion;
said panel defining at least one tab receiving slot positioned in the central portion between the views;
said panel defining at least one view panel locating feature positioned adjacent the lower edge beneath the views;
wherein the view panel locating feature comprises a lower edge portion of the view panel.

34. A stereoscopic view set for a stereoscope, said view set comprising:
a view panel which supports a pair of stereoscopic views in side by side arrangement fixedly positioned on one surface thereof, said panel defining a lower edge and a central portion, said views positioned on respective sides of the central portion;
said panel defining at least one tab receiving slot positioned in the central portion between the views;
said panel defining at least one view panel locating feature positioned adjacent the lower edge beneath the views;
wherein the view panel locating feature comprises a tab formed on a lower edge portion of the view panel.

* * * * *

UNITED STATES PATENT AND TRADEMARK OFFICE
CERTIFICATE OF CORRECTION

PATENT NO. : 5,058,990

DATED : October 22, 1991

INVENTOR(S) : Timothy H. Bush

It is certified that error appears in the above-identified patent and that said Letters Patent is hereby corrected as shown below:

On the title page, Item [56]: under the heading "References Cited", please delete "1,204,613" and substitute therefor --1,024,613"; after "2,821,884" please delete "2/1958" and substitute therefor --8/1954--; and after "2,984,153" please delete "5/1961" and substitute therefor --3/1957--.

In column 1, line 12, after the first occurrence of "as" please insert --early--.

In column 2, line 1, after "Maerz" please insert --,--.

In column 2, line 3, please delete "View" and substitute therefor --view--.

In column 3, line 21, please delete ",/".

In column 4, line 43, please delete "bet ween" and substitute therefor --between--.

In column 4, line 64, after "advantages" please insert --.--.

UNITED STATES PATENT AND TRADEMARK OFFICE
CERTIFICATE OF CORRECTION

PATENT NO. : 5,058,990

DATED : October 22, 1991

INVENTOR(S) : Timothy H. Bush

It is certified that error appears in the above-identified patent and that said Letters Patent is hereby corrected as shown below:

Column 9, line 26    please delete "lest" and substitute therefor --least--.

Column 9, line 55    please delete "lest" and substitute therefor --least--.

Signed and Sealed this

Twenty-ninth Day of June, 1993

Attest:

MICHAEL K. KIRK

*Attesting Officer*    *Acting Commissioner of Patents and Trademarks*